US009146975B2

(12) United States Patent
Chintala et al.

(10) Patent No.: US 9,146,975 B2
(45) Date of Patent: Sep. 29, 2015

(54) SYSTEMS AND METHODS FOR INTEGRATION OF BUSINESS APPLICATIONS WITH ENTERPRISE CONTENT MANAGEMENT SYSTEMS

(75) Inventors: Sreekanth Chintala, Bangalore (IN); Rama Vijjapurapu, Bangalore (IN); Todd Price, Chanhassen, MN (US); Nathan Angstadt, Colorado Springs, CO (US); Hari Charan Ramachandra Rao, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 536 days.

(21) Appl. No.: 13/457,179

(22) Filed: Apr. 26, 2012

(65) Prior Publication Data

US 2013/0219470 A1 Aug. 22, 2013

Related U.S. Application Data

(60) Provisional application No. 61/600,408, filed on Feb. 17, 2012.

(51) Int. Cl.
*G06F 7/04* (2006.01)
*G06F 17/30* (2006.01)

(52) U.S. Cl.
CPC ................. *G06F 17/30575* (2013.01)

(58) Field of Classification Search
CPC ................................ H04L 2209/603
USPC .................. 726/26, 27; 705/901, 908, 57
See application file for complete search history.

(56) References Cited

U.S. PATENT DOCUMENTS

| 7,818,344 | B2 | 10/2010 | McVeigh et al. | |
| 7,921,112 | B2 | 4/2011 | Bush et al. | |
| 2002/0049717 | A1 | 4/2002 | Routtenberg et al. | |
| 2008/0126513 | A1 | 5/2008 | Bouchard et al. | |
| 2010/0161616 | A1* | 6/2010 | Mitchell | 707/741 |
| 2010/0223559 | A1 | 9/2010 | Shrufi | |

(Continued)

FOREIGN PATENT DOCUMENTS

EP  2381395 A1  10/2011

OTHER PUBLICATIONS

ImageNow, "About Perceptive Software," retrieved from http://www.perceptivesoftware.com/images/PSI_Financial-Services.pdf on Nov. 22, 2012, 16 pages.

(Continued)

*Primary Examiner* — Christopher Brown
(74) *Attorney, Agent, or Firm* — Kilpatrick Townsend & Stockton, LLP

(57) ABSTRACT

Various arrangements for managing access to unstructured data are presented. A plurality of access requests may be received from a plurality of remote computer systems to a plurality of business entities stored by a content management server. In response to receiving a request for access to a business entity of the plurality of business entities stored by a content management server from a remote computer system, an identifier request may be transmitted to the content management server. A response from the content management server may be received in response to the identifier request. A resource locator that comprises the identifier may be created. The resource locator may be transmitted to the remote computer system for use in accessing the business entity.

17 Claims, 7 Drawing Sheets

(56) References Cited

U.S. PATENT DOCUMENTS

| | | | |
|---|---|---|---|
| 2011/0219410 A1* | 9/2011 | Kahn et al. | 725/92 |
| 2011/0302211 A1* | 12/2011 | Kilday et al. | 707/785 |
| 2012/0311697 A1* | 12/2012 | Swingler et al. | 726/17 |
| 2013/0174272 A1* | 7/2013 | Chevalier et al. | 726/28 |
| 2013/0191886 A1* | 7/2013 | Goyal | 726/5 |

OTHER PUBLICATIONS

NewsShark, "DocuLex Releases Archive Studio WebSearch 4.1—Information Technology News" retrieved from http://gilbane.com/news/2008/09/doculex_releases_archive_studi.html on Nov. 22, 2011, 2 pages.

Shultz, Anne, "Controlling the emerging Data Dilemma: Building Policy for Unstructured Data Access," retrieved from http://www.itm.iit.edu/data/IIT-ITMwhitepaper_BuildingPolicyForUnstructuredDataAccess.pdf on Nov. 22, 2011, Dec. 23, 2009, 14 pages.

Unitas, "A Single View: Integrating Structured and Unstructured Data/Information within the Enterprise" retrieved from http://Isdis.cs.uga.edu/GlobalInfoSys/Structured-and-Unstructured-for-EIPs.pdf on Nov. 22, 2011, Jan. 2002, 20 pages.

Unkown, "Integrating structured and unstructured data," 14th PNEC Conference, retrieved from http://www.petris.com/productfiles/Letter/The%20Challenges%20of%20integrating%20Structured%20and%20Unstr.pdf on Nov. 22, 2011, 10 pages.

* cited by examiner

SYSTEMS AND METHODS FOR INTEGRATION OF BUSINESS APPLICATIONS WITH ENTERPRISE CONTENT MANAGEMENT SYSTEMS

CROSS REFERENCES TO RELATED APPLICATIONS

This application claims priority to provisional application No. 61/600,408, filed Feb. 17, 2012, entitled "Integration of Business Applications with Enterprise Content Management Systems." The entire disclosure of the provisional application is hereby incorporated by reference for all purposes.

BACKGROUND

A content management system (CMS) may be used to store and control access to data items. Such data items may include unstructured data items, such as images of receipts, documents, invoices, etc. While a content management system may work well when a user directly interacts with an interface for the content management system, in some situations multiple applications may need to access the same data items stored by the CMS. Such applications may typically use their own data repositories to store data items. Further, each of these applications may have disparate security profiles for the same user. As such, access to the same stored data items may be governed by different security models depending on which application the data item is accessed through.

SUMMARY

In some embodiments, a method for managing access to a plurality of business entities' attachments is present. The method may include storing, by a content management server, the plurality of business entities. Each business entity attachment of the plurality of business entities may comprise an unstructured data item. The method may include receiving, by a mediator server, a request for a business entity attachment of the plurality of business entities. The request may be received from a business application executed by a remote computer system. The mediator server may be configured to receive requests from multiple different business applications executed by multiple remote computer systems. The method may include sending, by the mediator server, an identifier request to the content management server. The identifier request may identify the business entity attachment. The method may include assigning, by the content management server, an identifier to the business entity attachment. The method may include sending, by the content management server, the identifier to the mediator server. The method may include creating, by the mediator server, a universal resource indicator comprising the identifier. The method may include transmitting, by the mediator server, the universal resource indicator to the business application executed by the remote computer system.

Embodiments of such a method may include one or more of the following: In response to receiving the identifier request from the mediator server, the method may include creating, by the content management server, a new identifier linked with the requested business entity attachment. The method may include determining, by the mediator server, to transmit the identifier request to the content management server selected from a plurality of content management servers at least partially based on content of the request. The method may include transmitting, by the business application executed by the remote computer system, a request for a universal resource locator to the content management server. The method may include, in response to receiving the request for the universal resource locator, transmitting, to the remote computer system by the content management server an unstructured data item of the business entity.

Embodiments of such a method may alternatively or additionally include one or more of the following: The method may include, before transmitting the request for the business entity attachments, determining, by the business application executed by the remote computer system, authorization of a user to access the business entity. Authorization of the user may be determined using a security profile specific to the business application executed by the remote computer system. The method may include storing, by the content management server, a timestamp linked with the identifier, wherein the timestamp indicates when the identifier was created. The method may include transmit one or more unstructured data items of a requested business entity in response to receiving the request for a universal resource locator only if the timestamp indicates a time within a threshold period of time. The identifier may be one of a plurality of identifiers stored within a database by the content management server. Each identifier may differ from each other identifier of the plurality of identifiers.

In some embodiments, a system for managing access to unstructured data is presented. The system may include a mediator server. The mediator server may be configured to receive a plurality of access requests from a plurality of remote computer systems to a plurality of business entities' attachments stored by a content management server. The plurality of remote computer systems may execute different business applications through which access is requested. In response to receiving a request for access to a business entity attachment of the plurality of business entities' attachments stored by the content management server from a remote computer system, the mediator server may be configured to transmit an identifier request to the content management server. The mediator server may be configured to receive a response from the content management server in response to the identifier request, wherein the response comprises an identifier. The mediator server may be configured to create a resource locator that comprises the identifier. The mediator server may be configured to transmit the resource locator to the remote computer system for use in accessing the business entity attachment.

Embodiments of such a system may include one or more of the following: The system may include a content management server. The content management server may be configured to store the plurality of business entities' attachments. The content management server may be configured to assign the identifier to the business entity attachment in response to receiving the identifier request from the mediator server. The content management server may be configured to transmit the business entity attachment to the remote computer system based upon receiving a request for the resource locator. The system may further comprise a remote computer system. The remote computer system may be configured to execute a business application. The remote computer system may be configured to determine, via the business application, a user's access rights to the business entity attachment at least partially based on a security profile associated with the business application. The remote computer system may be configured to transmit the request for access to the business entity attachment stored by the content management server, wherein the request is transmitted to the mediator server. The business entity may comprise an unstructured data item. The content management system may be further configured to maintain a database comprising a plurality of identifiers and indications of business entities. The plurality of identifiers may comprise the identifier. Each identifier of the plurality of identifiers stored within the database may be linked with a corresponding business entity attachment of the plurality of business entities. Each identifier of the plurality of identifiers stored within the database may differ from each other identifier of the plurality of identifiers. The content management server may be configured to create a new identifier in response to receiving the identifier request from the mediator server. The content management server may be configured to maintain, within the database, a timestamp for each identifier of the plurality of identifiers. The content management server may be configured to transmit one or more unstructured data items of a requested business entity attachments only if the timestamp linked with the identifier of the plurality of identifiers is within a threshold period of time. The mediator server may be configured to select the content management server from a plurality of content management servers at least partially based on the business entity attachment identified by the request received from the remote computer system.

In some embodiments, a computer program product residing on a non-transitory processor-readable medium is presented. The computer program product may be for managing access to a plurality of attachments. The computer program product may comprise processor-readable instructions configured to cause a processor to receive a plurality of access requests from a plurality of remote computer systems to the plurality of attachments stored by a content management server. The plurality of remote computer systems may execute different business applications through which access is requested. In response to receiving a request for access to an attachment of the plurality of attachments stored by the content management server from a remote computer system, an identifier request may be transmitted to the content management server.

The computer program product may comprise processor-readable instructions configured to cause the processor to receive a response from the content management server in response to the identifier request. The response may comprise an identifier. The computer program product may comprise processor-readable instructions configured to cause the processor to create a resource locator that comprises the identifier. The computer program product may comprise processor-readable instructions configured to cause a processor to transmit the resource locator to the remote computer system for use in accessing the attachment.

Embodiments of such a computer program product may include one or more of the following: The processor-readable instructions may be further configured to cause the processor to: select the content management server from a plurality of content management servers at least partially based on the attachment identified by the request received from the remote computer system. Each attachment may be associated with a business entity.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
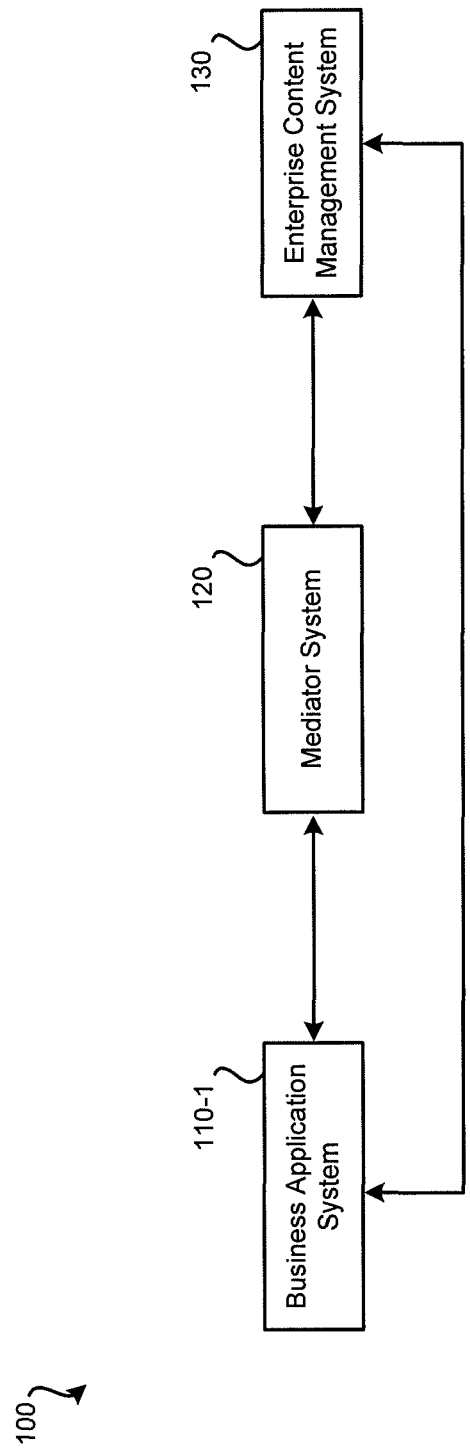
FIG. 1 illustrates an embodiment of a system for managing access to business entities.

Business applications may store structured data referred to as business entities. A content management system (CMS), which may also be referred to as an enterprise content management system (ECMS), may be used to store attachments to business entities which are unstructured data. Structured data may include data such as database entries, machine-encoded text documents, etc. Unstructured data may include data such as images. Such images may include: images of receipts, images of invoices, other scanned documents, or images of other types of documents. While such unstructured data may not be readily readable by a computer system (without first performing a process such as optical character recognition), information contained in the unstructured data items may need to be accessible to users of an enterprise as an attachment.

The same unstructured data items (e.g., attachments) may need to be accessed via multiple business applications. A particular unstructured data item may need to be accessible from a first business application and from a second business application. For example, an image of an invoice may need to be displayed to a user in an invoice management application and the same invoice may need to be displayed to a user in an account ledger management application. Typically, each business application may have its own data repository for data items, such as unstructured data including attachments. As such, multiple copies of the invoice may typically need to be stored, one for the first business application and one for the second business application. Further, for each of these business applications, a particular security model may need to be enforced for the user using each business application. Security models may be different per user and per application. For example, the security model may be different for the same user depending on which business application the user is logged into. Accordingly, a particular unstructured data item may be accessible to a user via a first business application, but the particular unstructured data item may not be accessible (or may be accessible with different permissions, such as read-only) via a second business application.

A content management system may be used to store unstructured data, however, security for access to the unstructured data may be managed by the business applications that access the stored unstructured data. A mediator system, which may be one or more separate computer systems or software-implemented modules, may receive requests for access to unstructured data items from a plurality of different business applications. Such business applications may be executed by multiple remote computer systems. Each business application may assess whether its current user is permitted access to a particular unstructured data item. If a user has a sufficient level of permission (e.g., full access, view/read-only), a request may be transmitted to the mediator system. The request may indicate the level of permission and/or the unstructured data item to which access is requested. The request may also identify the business application through which the request was made and/or an indication of the user (e.g., a username). The mediator system may or may not modify this request and may send an identifier request to a content management system. If the mediator system interacts with multiple content management systems, the mediator system may select the appropriate content management system from a group of available content management systems. For example, if an enterprise uses a separate content management system for invoices and faxed documents, the mediator system may be able to determine which is the appropriate content management system to request the unstructured data item from based on the received request.

The content management system, in response to receiving the identifier request, may determine the unstructured data (e.g., attachments) attempting to be accessed. An identifier may be returned to the mediator system. This identifier may be created by the CMS in response to receiving the identifier request and may be sent to the mediator system. The identifier and an indication of the unstructured data to which access is requested may be stored by the CMS. A database of identifiers and indications of the requested unstructured data may be stored by the CMS.

The mediator may construct a resource indicator, such as a universal resource locator, that contains the identifier and points to the content management system. This resource indicator may be returned to the remote computer system executing the business application from which the initial request was received. The resource indicator may then be used to request the unstructured data item from the CMS directly (e.g., not via the mediator system). The CMS, in response to receiving the request for the resource indicator containing the identifier, may identify the unstructured data that is requested. The CMS may return the unstructured data to the business application.

The above description refers to the request and retrieval of a single unstructured data item; however, it should be understood that embodiments may be directed to request and retrieval of multiple attachments. Such attachments may be associated with a particular business entity. A business entity may be linked with one or more unstructured data items. For example, a business entity may represent purchase order information, such as an order number, shipping address, etc. A business entity is structured data which may be associated with unstructured data items (e.g. attachments), such as scanned invoices, etc. In some embodiments, a business entity is linked with a single unstructured data item or a plurality of unstructured data items.

FIG. 1 illustrates an embodiment of a system 100 for managing access to business entities' attachments (that is, attachments linked with business entities). System 100 may include: business application system 110-1, mediator system 120, and enterprise content management system (ECMS) 130. Each of these systems may be physically distinct and may each include one or more computer systems. Business application system 110-1 may represent a remote computer that is executing or otherwise accessing a business application. Business application system 110-1 may represent a user's computer system that is locally executing a business application or a server through which a user is executing the business application (as such, the business application may be locally and/or remotely executed from the user). Through the business application, the user may need to access or otherwise interact with one or more business entity attachments. Such business entity attachments, rather than being stored by the business application, may be stored by an enterprise content management system. As such, the same unstructured data item (e.g., attachment) may be accessible via multiple business applications.

Through the business application executed by business application system 110-1, a user may request access to one or more business entity attachments. Business application system 110-1, via the executed business application, may evaluate whether the user of the business application is permitted to access the business entity attachments. The security model used to determine whether or not the user of the business application has access (and what level of access) to the business entity attachments may be particular to the business application being executed or accessed by business application system 110-1. As an example, through the business application being executed by business application system 110-1, a user may have read-only or full access rights to particular business entities' attachments. This same user's access rights may vary through another business application.

If access (e.g., read access only, read and write access) to a business entity attachment is permitted in accordance with the security model of the business application being executed by business application system 110-1, a request for the business entity attachment may be transmitted to mediator system 120 by a generic controller of the business application being executed by business application system 110-1.

Mediator system 120 may be one or more separate computer systems (e.g., a server) that receives requests from business application systems such as business application system 110-1. Requests received by mediator system 120 for business entities' attachments may be received from multiple different business applications. Further, these requests may be on behalf of multiple different users. The request from business application system 110-1 may identify the business entity attachment requested, the business application through which access is requested, and/or the level of access the user is entitled to. Additional information may also be present in the request received by mediator system 120. Mediator system 120 may be configured to forward (with or without modification) the request to the appropriate content management system. The request transmitted from mediator system 120 to enterprise content management system 130 may include the same information received in the request from business application system 110-1. Mediator system 120 may create a differently formatted (with the same or different information) request to send to enterprise content management system 130. This request sent to ECMS 130 may be referred to as an identifier request, because ECMS 130 may return an identifier in response to the identifier request.

Enterprise content management system 130 may represent a content management system that stores and controls access to multiple business entities for multiple users and business applications. Enterprise content management system 130 may be separate from mediator system 120. In response to receiving a request from mediator system 120, enterprise content management system 130 may associate an identifier with the request. This identifier may be unique from other identifiers stored by ECMS 130. The identifier may be created in response to receiving the request from mediator system 120. The identifier may be stored along with an indication of the business entity. As such, based on the identifier, ECMS 130 may be able to determine the business entity attachment attempting to be accessed.

ECMS 130 may send the identifier to mediator system 120 in response to the identifier request received from mediator system 120. Mediator system 120 may create a universal resource indicator (URI), universal resource locator (URL), or some other form of resource locator, using the identifier. For example, a URL may be created that points to ECMS 130 and includes the identifier received from ECMS 130. The URL, constructed by mediator system 120, may be provided to business application system 110-1. As such, the URL provided to business application system 110-1 may not provide a direct link to the requested business entity attachment stored by ECMS 130, but rather may provide a link to ECMS 130 with an indication of the identifier created in response to the request received by ECMS 130 from mediator system 120. As such, the identifier may be used by ECMS 130 to determine which business entity that business application system 110-1 is attempting to access.

Each component in system 100 of FIG. 1 is illustrated as connected to another component via arrows. It should be understood that such arrows may represent a direct connection or network connection. For example, one or more networks may be used for communication between business application system 110-1 and mediator system 120, such as the Internet or a corporate intranet. Similarly, the same or different networks may be used for communication between mediator system 120 and enterprise content management system 130.

Upon receiving the URL, or in response to additional user input, the URL may be requested by business application system 110-1. Upon receipt of the URL (or other form of resource locator) from mediator system 120, a browser window may be launched and the URL accessed. The received URL may allow business application system 110-1 to directly request the business entity attachment from enterprise content management system 130. As such, after business application system 110-1 has received the constructed URL from mediator system 120, business application system 110-1 may interact directly with ECMS 130 without communicating through mediator system 120.

Figure 2:
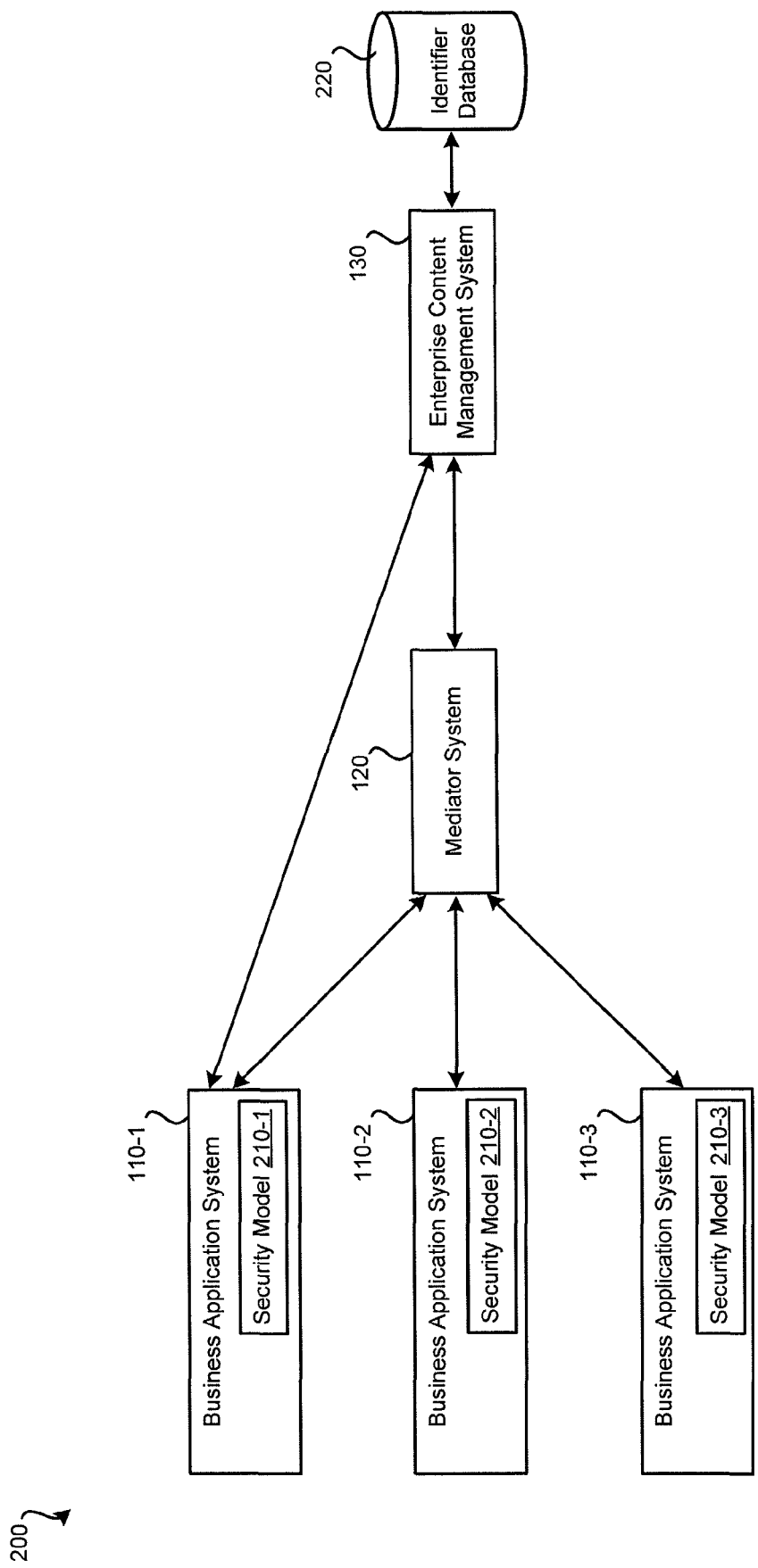
FIG. 2 illustrates an embodiment of a system for managing access to business entities, wherein access to business entities' attachments is requested via multiple business applications with disparate security models.

FIG. 2 illustrates an embodiment of a system 200 for managing access to business entities' attachments, wherein access to business entities' attachments is requested via multiple business applications with disparate security models. System 200 may represent an embodiment of system 100 of FIG. 1.

As illustrated in FIG. 2, business application systems 110-2 and 110-3 are present in addition to business application system 110-1. Business application systems 110-2 and 110-3 may execute (or otherwise access) different business applications. Business application systems 110-2 and 110-3 may be executed on behalf of different users. As with business application system 110-1, business application systems 110-2 and 110-3 may represent users' computer systems that are locally executing business applications or servers through which users are executing the business applications (as such, the business applications may be locally and/or remotely executed from the users). Security models 210-2 and 210-3 associated with the business applications executed by business application systems 110-2 and 110-3, respectively, may differ from security model 210-1 of business application system 110-1. Requests for access to business entities' attachments from business application systems 110-2 and 110-3 may also be routed to mediator system 120 (as previously described in relation to business application system 110-1). Each of business application systems 110 may have a security model 210. These security models may differ or may be the same. Whether a user is permitted to access a particular business entity attachment stored by ECMS 130 may be based on the security model of the business application being executed by the business application system being accessed by the user. As such, for a given user, a particular business entity attachment stored by ECMS 130 may be accessible via a first business application (e.g., executed by business application system 110-1) if the first business application's security model permits access; however, access may be blocked, restricted, or otherwise different for the same user attempting to access the same business entity attachments through a second business application because the second business application's security model restricts such access.

As illustrated in FIG. 2, business application system 110-1 may communicate directly (that is, not through mediator system 120) with ECMS 130. This may occur after mediator system 120 has provided a URL to business application system 110-1 containing the identifier assigned to the business entity attachment by ECMS 130. The URL provided to business application system 110-1 may be used to request the business entity attachment stored by ECMS 130.

The requested URL may be transmitted to ECMS 130. Upon receiving the URL (or other resource locator) from business application system 110-1 containing the identifier, ECMS 130 may determine if the identifier is still valid. For instance, if more than a predefined amount of time has elapsed since the identifier was created and/or assigned to the business entity attachment by ECMS 130, the identifier may no longer be valid and the request may be denied. In some embodiments, in the initial request made to mediator system 120 by business application system 110-1, an amount of time may be specified for which the identifier is valid (e.g., 30 minutes). Using the identifier, ECMS 130 may identify the (one or more) business entity attachments that are requested by business application system 110-1. A database of identifiers may be maintained by ECMS 130. Each time an identifier request is received from mediator system 120, an identifier may be created and added to identifier database 220. Each identifier within identifier database 220 may be different from other identifiers within the database. As such, upon receipt of an identifier, ECMS 130 can determine the specific business entity attachment referred to. Table 1 illustrates an exemplary handful of entries from identifier database 220.

TABLE 1

| Identifier | Business Entity | Creation Timestamp |
| --- | --- | --- |
| 2948304983 | 021756-127000 | 4/27/12 3:34 PM |
| 3409342849 | 021923-064300 | 4/27/12 3:39 PM |
| 9932443843 | 020375-199001 | 4/27/12 4:01 PM |

In the above examples from identifier database 220, the created identifiers are random numbers that are unique from each other. In other embodiments, sequential identifiers (or some other pattern of identifiers) may be used. In the example of Table 1, each business entity is a file number that the user is requesting access to and each of these business entities may be linked with one or more unstructured business entity attachments, such as images of documents. The creation timestamp may be based on the date and/or time when the identifier request was received from mediator system 120. When a URL (or other resource locator) is received, the creation timestamp may be used to determine if the identifier is still valid. In some embodiments, after the identifier expires, it may be deleted from identifier database 220. As such, if a request is received for an identifier not present in identifier database 220, an error may be returned that indicates an invalid or expired identifier.

When a request for a URL is received by ECMS 130, it may access identifier database 220 to determine: the business entity associated with the identifier indicated in the URL and/or whether the identifier is valid. Access to the business entity may be granted by ECMS 130 and/or a specific unstructured data item may be transmitted to business application system 110-1 (without involving mediator system 120). An unstructured data item may be presented to a user via a browser window by business application system 110-1. Viewing and/or editing of the unstructured data item (in accordance with the security model of the business application through which access to the business entity attachment was requested) may occur between business application system 110-1 and enterprise content management system 130 without requiring communication with mediator system 120.

While FIGS. 1 and 2 are described in relation to a single request being received from business application system 110-1 for a business entity, it should be understood that mediator system 120 and ECMS 130 may be handling multiple requests from multiple different remote computer systems (which may be executing different business applications with different security models). For example, requests may be received from business application systems 110-2 and 110-3 by mediator system 120.

By having the enterprise content management system decoupled from the business applications, it may be easier to add additional business applications that can access the same unstructured data items via a mediator.

Figure 3:
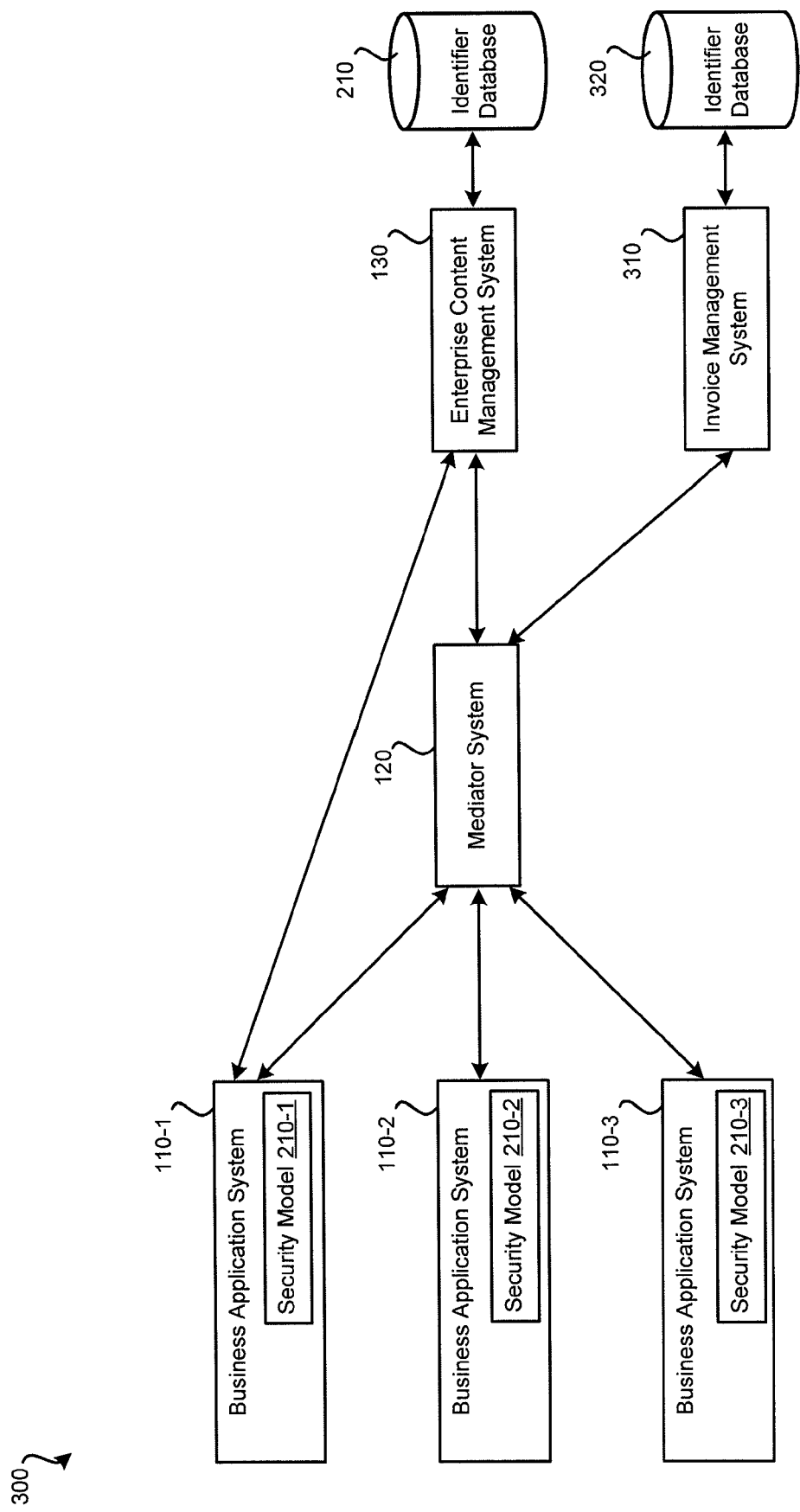
FIG. 3 illustrates an embodiment of a system for managing access to business entities' attachments stored by multiple content management systems, wherein access to business entities' attachments is requested via multiple business applications with disparate security models.

FIG. 3 illustrates an embodiment of a system 300 for managing access to business entities' attachments stored by multiple content management systems, wherein access to business entities' attachments is requested via multiple business applications with disparate security models. System 300 may represent an embodiment of system 100 and/or system 200 of FIGS. 1 and 2, respectively. In system 300, mediator system 120 is configured to interact with multiple enterprise content management systems.

Some business enterprises may maintain multiple content management systems. As an example, a first content management system may be used for storage of engineering data (e.g., ECMS 130) while a second content management system may be used for invoices. Of course, other divisions of data may be possible between multiple content management systems.

Mediator system 120 may be configured to send identifier requests to the appropriate content management system. Based on a request received from a business application system, mediator system 120 may be configured to determine the proper content management system to send an identifier request to. In FIG. 3, two content management systems are illustrated: ECMS 130 and invoice management system 310 (which, more generally, could also be referred to as a CMS or ECMS). Upon receiving a request for one or more business entity attachments from a business application system, mediator system 120 may evaluate the request and determine the appropriate content management system to send an identifier request to. The mediator system 120 may determine the appropriate CMS based on the business entity attachment requested, the type of business entity attachment requested, the requesting user, the requesting business application, etc.

While two content management systems are shown in system 300 in communication with mediator system 120, it should be understood that a greater number of content management systems may be possible in other embodiments. Invoice management system 310 may function similarly to ECMS 130. For instance, identifier database 320 may be used to maintain identifiers that were created in response to received requests from mediator system 120.

Figure 4:
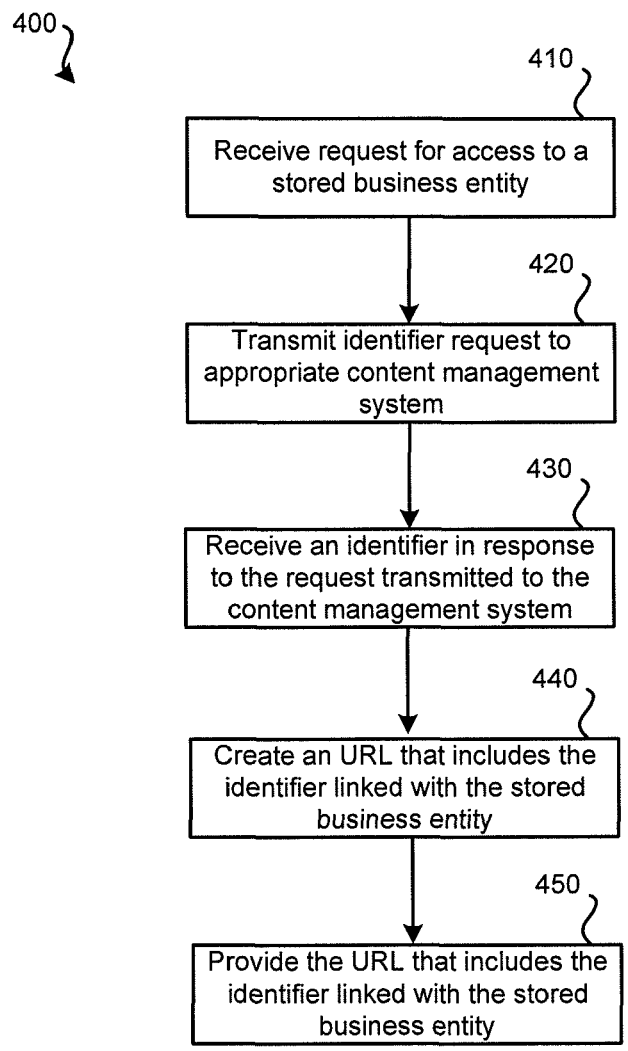
FIG. 4 illustrates an embodiment of a method for managing access to business entities' attachments.

FIG. 4 illustrates an embodiment of a method 400 for managing access to business entities. Method 400 may be performed using the systems of FIGS. 1 through 3, or some other system configured for managing access to business entities. Each step of method 400 may be performed by a computer system. Means for performing method 400 includes one or more computer systems. More specifically, method 400 may be performed by a mediator system, such as mediator system 120 of FIGS. 1 through 3.

At step 410, a request for access to a stored business entity attachments may be received by a mediator system, such as mediator system 120 of FIGS. 1 through 3. The mediator system may include one or more computer systems. The request may identify the (one or more) business entity attachment, which, as previously detailed, may be a particular unstructured data item or may be a folder or other grouping that includes unstructured items. The request may also identify the user who performed the request, a permitted access level, the business application through which the request was made, and/or other information. The request may be received from a remote computer system that is executing or otherwise accessing a business application. The mediator system may be configured to receive requests from multiple remote computer systems that are executing (or otherwise accessing) multiple, different business applications. At least some of these business applications may have disparate security models. As such, what actions are permitted in relation to unstructured data items may vary for users by business application.

The business application through which the request is transmitted by the remote computer system may determine whether or not the user has access and/or the appropriate level of access before contacting the mediator system. As such, no request may be transmitted to the mediator system if the user interacting with the business application via the remote computer system has insufficient permission in accordance with the security model of the business application. As such, the business application (rather than the mediator or ECMS) may handle security by determining whether the user should be given access (and how much access) to the requested business entity attachment. As such, if the mediator system receives a request, it may be assumed that the user has at least some level of permission to access the business entity.

At step 420, a request may be transmitted to the appropriate content management system by the mediator system. This may involve the mediator system inspecting the request received at step 410 to determine the appropriate content management system to receive the request. The mediator system may create an identifier request at step 420 based on the request received at step 410. At step 420, the request transmitted by the mediator system may be received by the appropriate content management system. For example, referring to system 300 of FIG. 3, mediator system 120 may select the appropriate content management system from among ECMS 130 and invoice management system 310 based on the request received at step 410.

At step 430, in response to the identifier request transmitted at step 420 by the mediator system to the appropriate ECMS, an identifier may be received. This identifier may be a string of characters that has been linked to the requested business entity attachment by the ECMS. At step 440, a universal resource location (URL), universal resource indicator (URI), or some other form of resource locator may be constructed by the mediator system that identifies a location where the business application system can access the requested business entity attachments. The URL may contain the identifier assigned by the content management system. For instance, a URL may point to the proper content management system and contain the identifier. The actual location of the business entity attachment within the storage of the content management system may not be revealed within the resource locator.

At step 450, the URL may be transmitted to the business application system from which the request was received at step 410. This may conclude the transaction from the mediator system's point of view. The URL provided to the business application system may be used by the remote computer system executing the business application to directly (e.g., without further use of the mediator system) request and access the business entity attachment that includes at least one unstructured data item.

Following, before, or concurrently with performing method 400 for a received request, method 400 may be being performed by a mediator system for other requests received from other remote computer systems that are executing the same or different business applications. These other business applications may use different security models than each other.

Figure 5A:
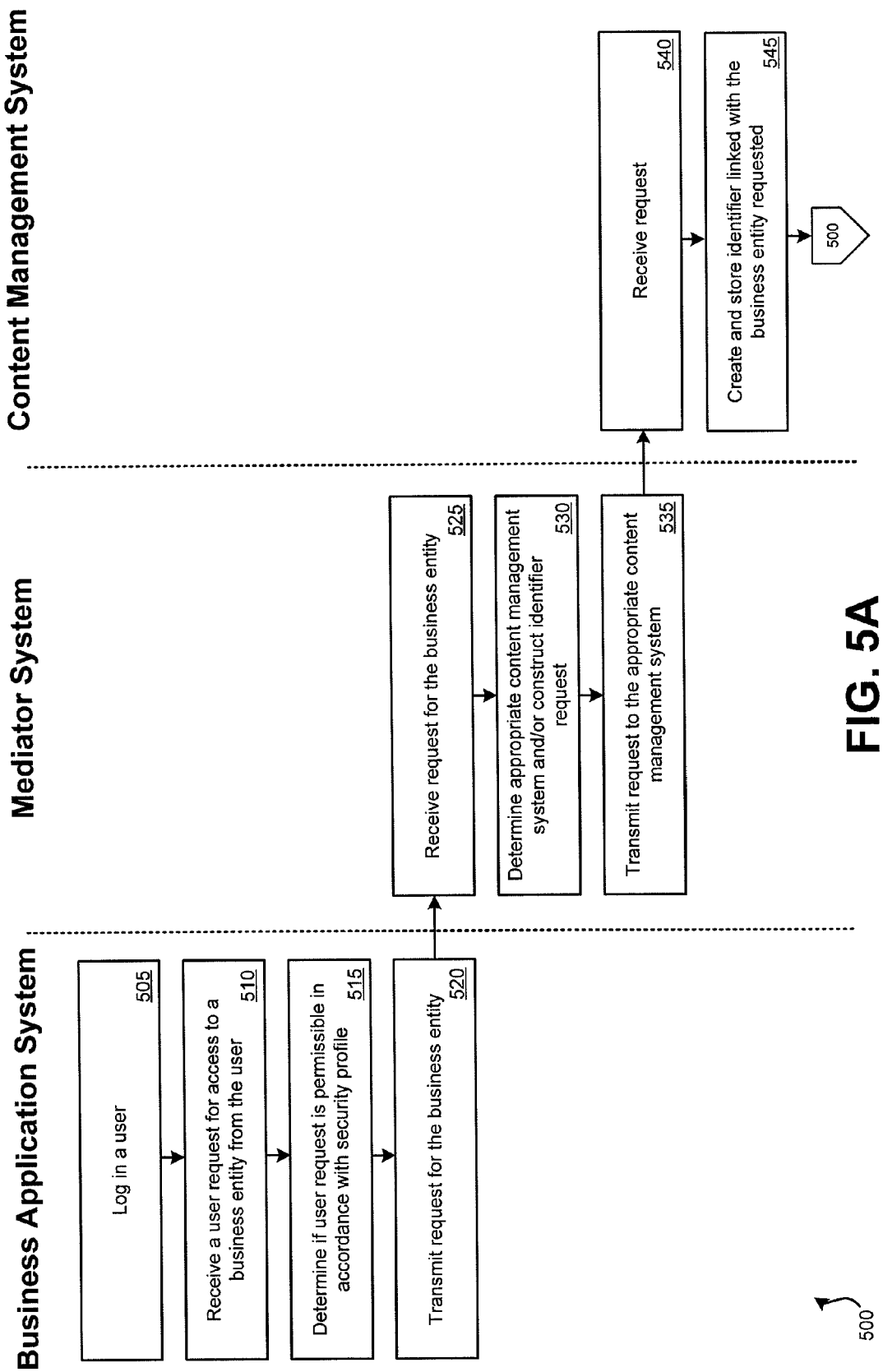
FIGS. 5A and 5B illustrate another embodiment of a method for managing access to business entities' attachments.
Figure 5B:
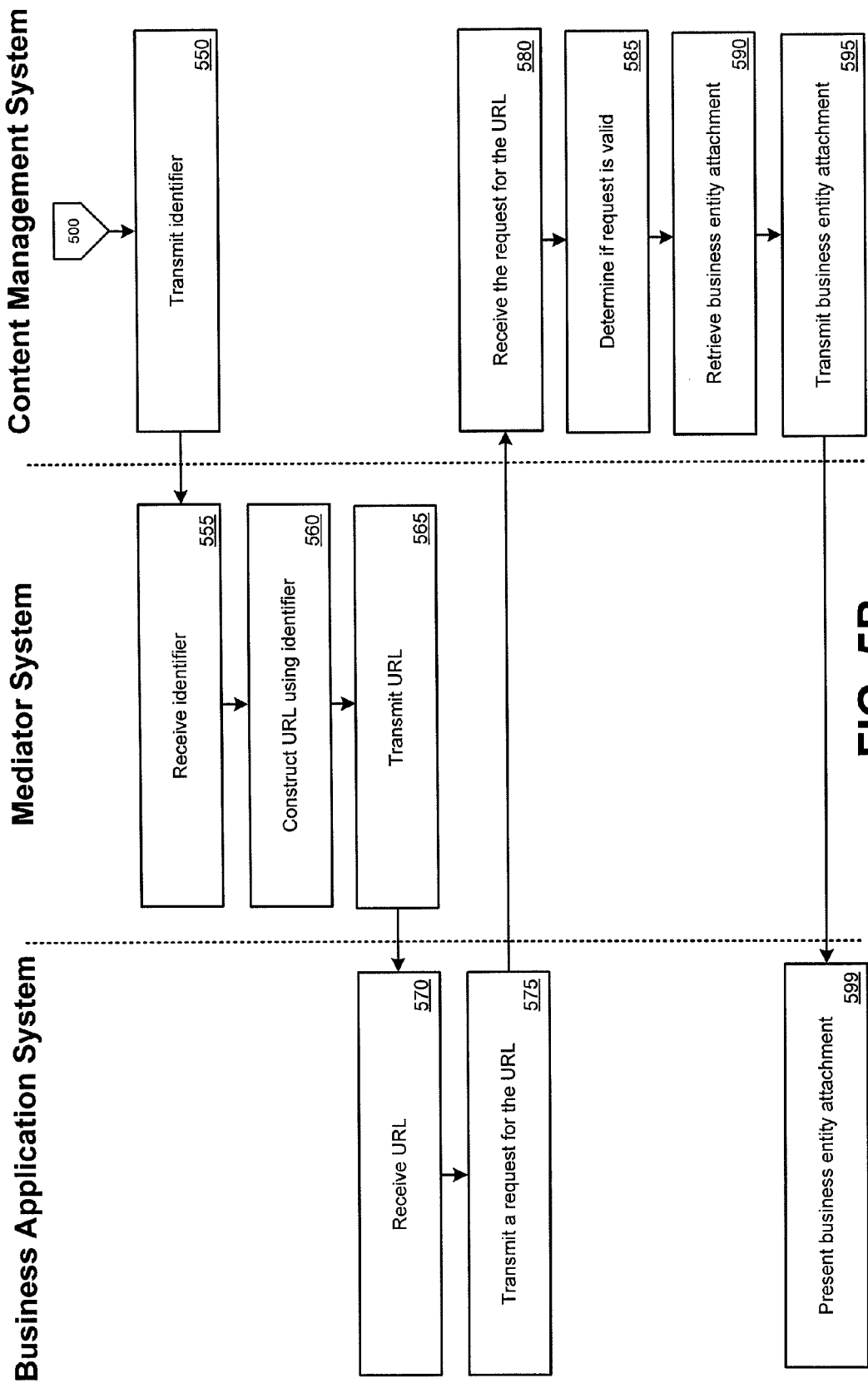

FIGS. 5A and 5B together illustrate an embodiment of method 500 for managing access to business entities' attachments. Method 500 may represent an embodiment of method 400 as performed by a business application system, mediator system, and content management system (or ECMS). Referring to FIG. 1, the referenced business application system may refer to business application system 110-1, mediator system may refer to mediator system 120, and the content management system may refer to ECMS 130. Each of these systems may represent a separate system of one or more computer systems (e.g., servers). In some embodiments, various modules may be performed by a single computer system, for example, the mediator system and content management system may be performed by the same computer system. Each step of method 500 may be performed using a computer system.

Beginning on FIG. 5A, at step 505, a user may log into a business application. This business application may be being executed locally by a computer system the user is directly interacting with or may be accessed remotely via a network. For example, some or all of the business applications may be executed remotely from the user at a server and may be accessed via a user computer system. The user logging in to the business application may include the user providing a username, password, and/or other identification and authentication data. Once successfully logged in, the user may interact with the business application.

At step 510, the user may request access to a particular business entity attachment. This business entity attachment, as previously detailed, may include one or more unstructured data items. At step 515, the business application may determine if the user is permitted access to the business entity attachment and, if so, what level of access is permitted. Therefore, the user's access rights to the requested business entity attachments may be determined in accordance with a security model of the business application. (Since security profiles may vary for a user between different business applications, if the user attempted to access the same business entity attachment through a different business application, the user's access level may be different.) If, in accordance with the security profile of the business application, access is not granted, no information may be transmitted to the mediator system and the user may receive an error (e.g., an access denial). If, in accordance with the security profile of the business application, at least some level of access is granted to the business entity attachment, a request for the business entity attachment may be transmitted to the mediator system at step 520. At step 525, this request may be received by the mediator system (via a public and/or private network).

At step 530, if multiple content management systems are in communication with the mediator system, the mediator system may determine the appropriate content management system to which an identifier request is to be transmitted. This determination may be based on the content of the request received at step 525. For instance, the requested business entity attachments, the business application, the user, or some other information present within the request received at step 525 may be used to determine the appropriate content management system to send an identifier request to. Also, at step 530, an identifier request may be constructed by the mediator system. This may involve just rerouting the request received from the business application system; in some embodiments, it may involve adding, subtracting, and/or reforming information contained in the request received at step 525. At step 525, no assessment may be performed by the mediator system as to the access rights of the user because such an assessment has previously been performed via the security profile of the business application through which the user submitted the request for the business entity attachments. This identifier request may be sent by the mediator system at step 535 to the content management system and may be received by the content management system at step 540 (via a public and/or private network).

At step 545, the content management system may create an identifier in response to receiving the identifier request from the mediator system at step 540. The identifier may be unique from other identifiers stored by the content management system. The identifier may be stored by the content management system, along with an indication of the business entity attachment to be accessed, and a timestamp (that may be indicative of when the request was received at step 540). Table 1 provides an example of information which may be stored by the content management system, such as in an identifier database. Additional information may also be stored as part of such identifier database, such as information about the user and/or business application requesting access to the requested business entity attachments. In some embodiments, rather than creating an identifier, an identifier may be retrieved from a pool of available identifiers. Method 500 continues on FIG. 5B. At step 545, no assessment may be performed by the content management system as to the access rights of the user because such an assessment has previously been performed via the security profile of the business application through which the user submitted the request for the business entity attachment. At step 550, the identifier and, possibly, an indication of the identifier request with which it is associated, may be transmitted to the mediator system at step 550. At step 555, the identifier (and an indication of the associated identifier request) may be received by the mediator system.

At step 560, a universal resource location (URL), universal resource indicator (URI), or some other form of resource locator may be constructed by the mediator system that identifies a location where the business application system can access the requested business entity attachments. For the remainder of method 500, the example of a URL for the resource locator is used. The URL may contain the identifier assigned by the content management system and received by the mediator system at step 555. For instance, a URL may point to the proper content management system and contain the identifier. The actual location of the business entity attachment within a storage arrangement of the content management system may not be revealed by the resource locator. This may be for security reasons. The URL constructed at step 560 may be transmitted to the business application system at step 565. The URL may be received by the business application system at step 570.

At step 575, the business application system may attempt to retrieve the URL. This may occur without requiring any user input. For example, upon receiving the URL at step 570, a new browser window (or other data display interface) may be automatically launched by the business application system executing the business application for the user. In some embodiments, the user may be prompted whether to access the URL. Accessing the URL may result in the business application system communicating with the content management system (which may not be via the mediator). The request for the URL may be transmitted by the business application system at step 575. This request may be received by the content management system at step 580. The mediator may not be involved in this request.

Upon receiving the request for the URL at step 580, the content management system may identify the business entity attachment that is being requested. This may be accomplished by accessing the identifier database that has stored identifiers linked with indications of business entities, such as in Table 1. The CMS may also determine if the identifier is valid at step 585. This may be accomplished by comparing the time the URL is received by the content management system at step 580 to a timestamp linked with the creation or assignment of the identifier stored in the database. If a predefined period of time has expired (and/or a period of time specified by the business application), access to the business entity attachment may be denied. Some business applications, according to their security profiles, may set maximum amounts of time for which access to a business entity attachment is to be permitted by the user. Expired identifiers may be deleted from the identifier database by the content management system. Accordingly, if the identifier present within the URL received at step 580 is not present within the identifier database, this may be an indication that the identifier is invalid, possibly because it expired and was deleted from the identifier database. This may prevent a user from saving a URL and attempting to access a business entity attachment at a later time or date. For example, an identifier may be valid for 1 minute, 5 minutes, 1 hour, 1 day, or 1 week, to name only a few examples.

If the identifier is determined to be valid, the appropriate business entity attachment (which may include one or more unstructured data items) may be retrieved at step 590 and may be transmitted by the content management system to the business application system (which may not occur via the mediator) at step 595. The business entity attachments may be presented to the user via a web browser window at step 599.

Figure 6:
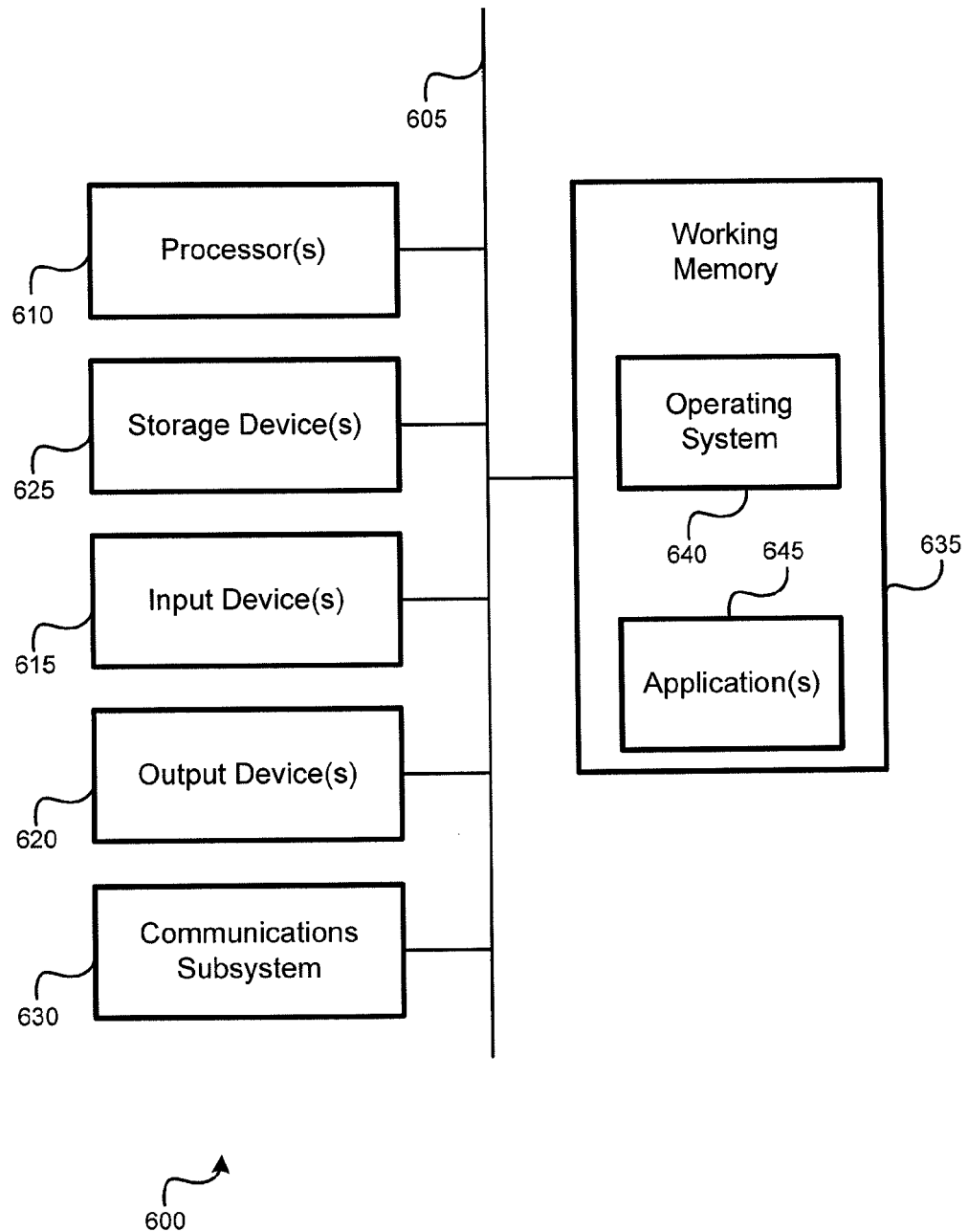
FIG. 6 illustrates an embodiment of a computer system.

A computer system as illustrated in FIG. 6 may represent at least part of the previously described computerized devices. For example, computer system 600 can represent some of the components of the business application systems, mediator system, and/or (enterprise) content management systems. FIG. 6 provides a schematic illustration of one embodiment of a computer system 600 that can perform the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for managing access to a plurality of business entity attachments, the method comprising:
   storing, by a content management server, a plurality of business entities associated with the plurality of business entity attachments, the plurality of business entity attachments being unstructured data items;
   receiving, by a mediator server, a request for a business entity attachment of the plurality of business entity attachments, wherein:
      the request is received from a business application executed by a remote computer system;
      the business application determines the request is permissible in accordance with a security profile of the business application; and
      the mediator server is configured to receive requests from multiple different types of business applications executed by multiple remote computer systems;
   selecting, by the mediator server, the content management server from a plurality of available content management servers based on content of the request;

sending, by the mediator server, an identifier request to the content management server based on the received request, wherein the identifier request identifies the business entity attachment;

assigning, by the content management server, an identifier to the business entity attachment;

sending, by the content management server, the identifier to the mediator server;

creating, by the mediator server, a universal resource indicator comprising the identifier; and transmitting, by the mediator server, the universal resource indicator to the business application executed by the remote computer system.

2. The method for managing access to the plurality of business entity attachments of claim 1, the method further comprising:

in response to receiving the identifier request from the mediator server, creating, by the content management server, a new identifier linked with the requested business entity attachment.

3. The method for managing access to the plurality of business entity attachments of claim 1, the method further comprising:

transmitting, by the business application executed by the remote computer system, a request for a universal resource locator to the content management server; and in response to receiving the request for the universal resource locator, transmitting, to the remote computer system by the content management server, the business entity attachment.

4. The method for managing access to the plurality of business entity attachments of claim 1, the method further comprising:

before transmitting the request for the business entity attachment, determining, by the business application executed by the remote computer system, authorization of a user to access the business entity attachment.

5. The method for managing access to the plurality of business entity attachments of claim 4, wherein authorization of the user is determined using a security profile specific to the business application executed by the remote computer system.

6. The method for managing access to the plurality of business entity attachments of claim 2, the method further comprising:

storing, by the content management server, a timestamp linked with the identifier, wherein the timestamp indicates when the identifier was created; and transmit the business entity attachment in response to receiving the request for a universal resource locator only if the timestamp indicates a time within a threshold period of time.

7. The method for managing access to the plurality of business entity attachments of claim 6, wherein:

the identifier is one of a plurality of identifiers stored within a database by the content management server; and each identifier differs from each other identifier of the plurality of identifiers.

8. A system for managing access to unstructured data, the system comprising:

a mediator server, configured to:

receive a plurality of access requests from a plurality of remote computer systems to a plurality of business entity attachments stored by a content management server, wherein:

the plurality of remote computer systems execute different types of business applications through which access is requested; and the business application determines the request is permissible in accordance with a security profile of the business application;

select the content management server from a plurality of available content management servers based on content of the request;

in response to receiving a request for access to a business entity attachment of the plurality of business entity attachments stored by the content management server from a remote computer system, transmit an identifier request to the content management server;

receive a response from the content management server in response to the identifier request, wherein the response comprises an identifier;

create a resource locator that comprises the identifier; and transmit the resource locator to the remote computer system for use in accessing the business entity attachment.

9. The system for managing access to the unstructured data of claim 8, the system further comprising:

the content management server, configured to:

store the plurality of business entity attachments;

assign the identifier to the business entity attachment in response to receiving the identifier request from the mediator server; and transmit the business entity attachment to the remote computer system based upon receiving a request for the resource locator.

10. The system for managing access to the unstructured data of claim 9, the system further comprising:

the remote computer system, configured to:

execute a business application;

determine, via the business application, a user's access rights to the business entity attachment at least partially based on a security profile associated with the business application; and transmit the request for access to the business entity attachment stored by the content management server, wherein the request is transmitted to the mediator server.

11. The system for managing access to the unstructured data of claim 10, wherein the plurality of business entity attachments comprise unstructured data.

12. The system for managing access to the unstructured data of claim 10, wherein the content management server is further configured to:

maintain a database comprising a plurality of identifiers and indications of business entity attachments, wherein:

the plurality of identifiers comprises the identifier; and each identifier of the plurality of identifiers stored within the database is linked with a corresponding business entity attachment of the plurality of business entity attachments.

13. The system for managing access to the unstructured data of claim 12, wherein each identifier of the plurality of identifiers stored within the database differs from each other identifier of the plurality of identifiers.

14. The system for managing access to the unstructured data of claim 13, wherein the content management server is further configured to:

create a new identifier in response to receiving the identifier request from the mediator server.

15. The system for managing access to unstructured data of claim 13, wherein the content management server is further configured to:
   maintain, within the database, a timestamp for each identifier of the plurality of identifiers; and
   transmit the business entity attachment only if the timestamp linked with the identifier of the plurality of identifiers is within a threshold period of time.

16. A computer program product residing on a non-transitory processor-readable medium for managing access to a plurality of attachments, the computer program product comprising processor-readable instructions configured to cause a processor to:
   receive a plurality of access requests from a plurality of remote computer systems to the plurality of attachments stored by a content management server, wherein:
      the plurality of remote computer systems execute different types of business applications through which access is requested; and
      the business application determines the request is permissible in accordance with a security profile of the business application;
   select the content management server from a plurality of available content management servers based on content of the request;
   in response to receiving a request for access to an attachment of the plurality of attachments stored by the content management server from a remote computer system, transmit an identifier request to the content management server;
   receive a response from the content management server in response to the identifier request, wherein the response comprises an identifier;
   create a resource locator that comprises the identifier; and
   transmit the resource locator to the remote computer system for use in accessing the attachment.

17. The computer program product of claim 16, wherein each attachment is associated with a business entity of a plurality of business entities, each business entity comprising structured data.

* * * * *

UNITED STATES PATENT AND TRADEMARK OFFICE
CERTIFICATE OF CORRECTION

Page 1 of 1

PATENT NO. : 9,146,975 B2
APPLICATION NO. : 13/457179
DATED : September 29, 2015
INVENTOR(S) : Chintala et al.

It is certified that error appears in the above-identified patent and that said Letters Patent is hereby corrected as shown below:

On title page 2, item [56], column 2, line 10, delete "Unkown," and insert -- Unknown, --, therefor.

Signed and Sealed this
Thirty-first Day of May, 2016

Michelle K. Lee
*Director of the United States Patent and Trademark Office*